US008375372B2

(12) United States Patent
Bennett et al.

(10) Patent No.: US 8,375,372 B2
(45) Date of Patent: Feb. 12, 2013

(54) BUSINESS PROCESS EXECUTION LANGUAGE PROGRAM SIMULATION

(75) Inventors: Jonathan D. Bennett, Markham (CA); Malik S. Hemani, Mississauga (CA); William G. O'Farrell, Markham (CA)

(73) Assignee: International Business Machines Corporation, Armonk, NY (US)

( * ) Notice: Subject to any disclaimer, the term of this patent is extended or adjusted under 35 U.S.C. 154(b) by 2345 days.

(21) Appl. No.: 10/906,524

(22) Filed: Feb. 23, 2005

(65) Prior Publication Data

US 2006/0190926 A1 Aug. 24, 2006

(51) Int. Cl.
*G06F 9/45* (2006.01)
(52) U.S. Cl. ............................ 717/135; 703/22; 717/134
(58) Field of Classification Search .................. 717/134, 717/135
See application file for complete search history.

(56) References Cited

U.S. PATENT DOCUMENTS

| | | | |
|---|---|---|---|
| 5,216,592 A | 6/1993 | Mann et al. | |
| 5,737,581 A | 4/1998 | Keane | |
| 5,867,824 A | 2/1999 | Saito et al. | |
| 5,887,154 A | 3/1999 | Iwasa et al. | |
| 5,999,724 A | 12/1999 | Iwasa et al. | |
| 6,029,159 A | 2/2000 | Zorba et al. | |
| 6,064,998 A | 5/2000 | Zabloudil et al. | |
| 6,138,088 A | 10/2000 | Goeser | |
| 6,233,537 B1 | 5/2001 | Gryphon et al. | |
| 6,308,161 B1 | 10/2001 | Boden et al. | |
| 6,370,508 B2 | 4/2002 | Beck et al. | |
| 6,571,246 B1 | 5/2003 | Anderson et al. | |
| 6,662,355 B1 | 12/2003 | Caswell et al. | |
| 6,772,407 B1* | 8/2004 | Leymann et al. | 717/100 |
| 7,113,942 B2* | 9/2006 | Levanoni et al. | 707/3 |
| 2003/0028863 A1* | 2/2003 | Reichenthal | 717/135 |
| 2005/0005243 A1* | 1/2005 | Olander et al. | 715/747 |
| 2005/0071347 A1* | 3/2005 | Chau et al. | 707/100 |
| 2005/0251527 A1* | 11/2005 | Phillips et al. | 707/101 |
| 2006/0069920 A1* | 3/2006 | Jolley | 713/182 |
| 2006/0095274 A1* | 5/2006 | Phillips et al. | 705/1 |

OTHER PUBLICATIONS

IBM, "Improved Dead-Path-Elimination for Business Processes." IP.com Dec. 24, 2003 1-5. Sep. 9, 2007 <https://priorart.ip.com/download/IPCOM000021127D/IPCOM000021127D.pdf>.*
S.R. Decker, *Context Verb Object—A Notation Language*, IBM Technical Disclosure Bulletin, vol. 24, No. 10A (Mar. 1992).

* cited by examiner

*Primary Examiner* — Wei Zhen
*Assistant Examiner* — Matthew Brophy
(74) *Attorney, Agent, or Firm* — Steven M. Greenberg, Esq.; Carey, Rodriguez, Greenberg & O'Keefe

(57) ABSTRACT

A BPEL program simulator can include a document object modeler configured to arrange activities defined by a BPEL document into a document object model (DOM) tree. The DOM tree can include activity nodes and links between the activity nodes. The BPEL program simulator further can include simulation logic configured to process the activity nodes to emulate at least one BPEL activity selected from the group consisting of Sequence, Flow, While, Pick and OnMessage, Switch and Case, Invoke, Script, Receive, Reply, Empty, Staff, and Assign.

15 Claims, 2 Drawing Sheets

BUSINESS PROCESS EXECUTION LANGUAGE PROGRAM SIMULATION

BACKGROUND OF THE INVENTION

The present invention relates to the field of computerized business-to-business interactions in a Web services environment and more particularly to test environments for business process execution language (BPEL) programs.

DESCRIPTION OF THE RELATED ART

The achievement of universal interoperability between applications by using Web standards remains the principal goal of Web Services. Web Services use a loosely coupled integration model to allow flexible integration of heterogeneous systems in a variety of domains including business-to-consumer, business-to-business and enterprise application integration. The following basic specifications originally defined the Web Services space: the Simple Object Access Protocol (SOAP), the Web Services Description Language (WSDL), and Universal Description, Discovery, and Integration (UDDI). SOAP defines an XML messaging protocol for basic service interoperability. WSDL introduces a common grammar for describing services. UDDI provides the infrastructure required to publish and discover services in a systematic way. Together, these specifications allow applications to find each other and interact following a loosely coupled, platform-independent model.

Presently, the interaction model that is directly supported by WSDL essentially can be viewed as a stateless model of synchronous or uncorrelated asynchronous interactions. Models for business interactions typically assume sequences of peer-to-peer message exchanges, both synchronous and asynchronous, within stateful, long-running interactions involving two or more parties. Nevertheless, systems integration requires more than the mere ability to conduct simple interactions by using standard protocols. The full potential of Web Services as an integration platform will be achieved only when applications and business processes are able to integrate their complex interactions by using a standard process integration model.

The Business Process Execution Language (BPEL) for Web Services fulfills some aspects of a standard process integration model. The BPEL for Web Services specification defines a technology for integrating cross-enterprise business processes. By coordinating stateful interactions of loosely coupled services across enterprise boundaries, BPEL technology provides a means of modeling the interactions between an enterprise and its business partners, suppliers and customers and thus the value chain of the enterprise. More particularly, BPEL for Web Services defines a notation for specifying business process behavior based on Web Services.

BPEL provides a language for the formal specification of business processes and business interaction protocols. By doing so, BPEL for Web Services extends the Web Services interaction model and enables the model to support business transactions. The basic concepts of BPEL can be applied in one of two ways. A BPEL specified process can define a business protocol role, using the notion of an abstract process.

The relationship between two or more business protocol roles can be modeled as a partner link. Similarly, it is also possible to use BPEL to define an executable business process. In an executable business process, the logic and state of the process determine the nature and sequence of the Web Service interactions conducted at each business partner, and thus the interaction protocols.

To execute a BPEL program, one needs a BPEL engine which can run business processes in a Web Services environment. Unfortunately, BPEL engine implementations are known to be large and very complex in nature. Not only do BPEL engines require complete BPEL programs for execution, but BPEL engines further must be able to handle the task of correlation which itself can be a complex task to perform within the BPEL engine.

Not only are BPEL engines "heavyweight" in nature, but also it can be quite difficult to write complete BPEL programs. Unlike conventional development paradigms, the BPEL paradigm does not permit the incremental development and testing of application logic. Rather, in the typical BPEL environment, all Web Services are required to be configured first, before testing of the application can commence. The complete configuration of all Web Services in a BPEL program can be time consuming, however, and are not simple to configure. In addition, to the extent that one or more of the Web Services involve dependencies upon external programs, the external programs also must be configured for the Web Services environment.

Finally, the skilled artisan will recognize the latencies involved in testing BPEL programs. The test environments for BPEL programs can be heavyweight in nature and can consume substantial processing resources. The problems associated with the heavyweight nature of BPEL test environments can be exacerbated when debugging as the underlying virtual machines required to execute Web Services operate much more slowly when placed in debug mode. Thus, the slow performance of the test environment can translate to a slow debugging process overall.

SUMMARY OF THE INVENTION

The present invention addresses the deficiencies of the art in respect to testing BPEL programs and provides a novel and non-obvious method, system and apparatus for simulating the execution of a BPEL program. Importantly, the BPEL simulator of the present invention can simulate the execution of BPEL programs without involving the complexity associated with a BPEL engine. Moreover, the BPEL simulator of the present invention does not require a BPEL program to be complete in form. Rather, the BPEL simulator can execute a BPEL program in its incomplete state, thus permitting the incremental development of BPEL programs.

In accordance with the present invention, a BPEL program simulator can include a document object modeler configured to arrange activities defined by a BPEL document into a document object model (DOM) tree. The DOM tree can include activity nodes and links between the activity nodes. The BPEL program simulator further can include simulation logic configured to process the activity nodes to emulate at least one BPEL activity selected from the group consisting of Sequence, Flow, While, Pick and OnMessage, Switch and Case, Invoke, Script, Receive, Reply, Empty, Staff, and Assign.

Preferably, the BPEL simulator also can include a backing class processor programmed to generate backing classes for script logic specified in the activities. The backing class processor can include logic for querying the generated backing classes to ascertain a state of variables and method defined in the generated backing classes. The BPEL simulator further can include a message generator programmed to generate messages responsive to requested partner link operations to simulate conversations between the activities and external services. The BPEL simulator yet further can include a thread mapper configured to generate separate threads of execution for the activity nodes. Finally, the simulation logic can include dead path elimination.

A method for simulating BPEL programs can include producing a DOM tree from a BPEL document defining a BPEL program; and, simulating the BPEL program by emulating selected BPEL activities for activity nodes defined in the DOM tree. The method further can include generating an output report for the simulating step. The simulating step further can include producing backing classes for selected ones of the BPEL activities having embedded script logic; executing the backing classes when simulating the selected ones of the BPEL activities; and, querying the backing classes to ascertain a state of variables and methods defined by the backing classes subsequent to executing the backing classes. Notably, the producing and simulating steps can be repeated concurrently for multiple BPEL documents.

Preferably, the simulating step can include the steps of: (A) selecting a first one the BPEL activities; (B) evaluating a pre-condition to the selected one of the BPEL activities; (C) emulating the selected one of the BPEL activities only if permitted by the evaluating step; (D) selecting a next one of the BPEL activites; and, (E) repeating steps (B) through (D) for each of the BPEL activities. Preferably, the step of selecting a next one of the BPEL activities can include evaluating a post-condition for linking to the next one of the BPEL activities; and, performing the repeating step only if permitted by the step of evaluating the post-condition. Finally, dead link elimination can be performed if the step of evaluating the post-condition does not permit performing the repeating step.

In consequence of the present invention, a fully configured Web services environment need not be available for the operation of the BPEL simulator. Rather, the BPEL simulator can be a stand alone entity with no dependencies on any Web Services. In this regard, the invocations of Web Services can be simulated thus obviating the need to configure a complex Web Services environment to run BPEL programs. Of additional note, the BPEL simulator need not incorporate a large correlation engine as in the case of a traditional BPEL debugging environment. Rather, in the BPEL simulator of the present invention, correlation can be handled internally to the BPEL simulator.

Moreover, since the BPEL simulator is light-weight in nature, the BPEL simulator can be an ideal choice for debugging a BPEL program. Consequently, the BPEL simulator of the present invention can be used as a debug target. As such, other BPEL tools can utilize the BPEL simulator within their respective tooling. Therefore, due to the light-weight and stand-alone nature of the BPEL simulator, no performance issues will arise from including the BPEL simulator in another tool.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

Figure 1:
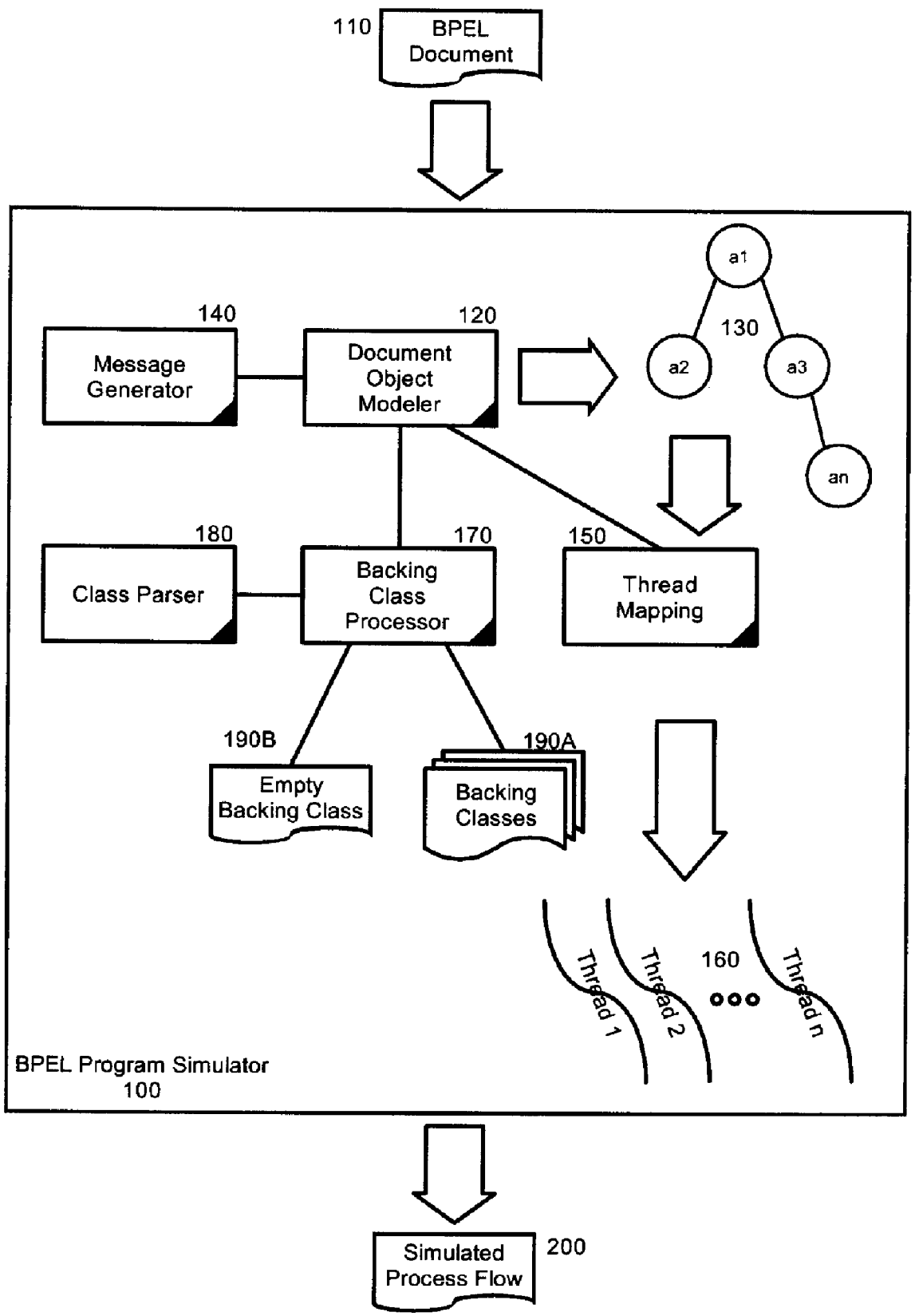
FIG. 1 is a schematic illustration of a system, method and apparatus for BPEL simulation which has been configured in accordance with a preferred aspect of the present invention.

FIG. 1 is a schematic illustration of a system, method and apparatus for BPEL simulation which has been configured in accordance with a preferred aspect of the present invention. The BPEL simulator 100 can be an engine which takes as input an BPEL document 110 and processes the BPEL document to produce an output 200 reflecting the process flow generated by the execution of the BPEL program defined by the BPEL document 110. Consequently, an end user can review the output 200 to determine whether the business process intended by the BPEL document 110 is correct, or whether the logic of the BPEL document 110 requires modification. Importantly, due to the lightweight nature of the BPEL simulator 100, the simulation can be performed multiple times in order to compare the results of each simulation.

Internally, the BPEL simulator 100 can include a document object modeler 120. The document object modeler 120 can process content of the BPEL document 110 into a document object model (DOM) 130 of activities implicated by the BPEL program defined by the BPEL document 110. The DOM 130 can include each of activity nodes, activity links and join/transition conditions (not shown). The BPEL simulator 100 also can include thread mapping logic 150 programmed to execute activities represented in the DOM 130 in separate threads of execution 160. The BPEL simulator 100 yet further can include backing class execution logic 170. The backing class execution 170 can simulate the execution of script logic disposed within the BPEL document 110 for an activity defined therein.

Specifically, a business process defined by the BPEL document 110 can include programmatic logic by including script elements in different ones of the activities. To support the inclusion of script elements, the backing class processor 170 and corresponding backing classes 190A can be provided in the BPEL simulator 100 which can be hand-coded or automatically generated code associated with correlation aware markup language messages. The backing classes 190A can contain the programmatic logic defined by the script elements of the business process in the form of variables and methods. In particular, the variables defined in the mapping of the business process can be represented by variables of the backing classes 190A.

Preferably, the code snippets defined for an activity can map onto one of the backing classes 190A as methods. These methods can be named according to the name of the associated activity. Notably, while there can be only one backing class for each activity defined for the business process, a business process lacking variables and scripts does not require a backing class. In that case, the backing class processor 170 can make use of a predefined empty backing class 190B having no variable or methods. In any case, the backing class processor 170 can locate any one of the backing classes 190A by the name of the process element defined inside the BPEL document 110.

When the execution of script logic is to be simulated, a class parser 180 which can be communicatively coupled to the backing class execution logic 170 can query the backing classes for the state of data and method members of the set of backing classes 190A. More specifically, at the start of a simulation, the backing classes 190A can be initialized by a constructor which can initialize the variables of the backing classes 190A to some default hard-coded values. When a script is encountered in an activity, the corresponding one of the backing classes 190A can be queried for information. Then, the particular method of the selected one of the backing classes 190A can be invoked using object reflection to execute the logic code inside the script element. To that end, the BPEL simulator 100 can utilize the class parser 180 which can scan the backing classes 190A for particular information regarding variables and methods. The file is read in line by line utilizing pattern matching to determine whether a particular variable or method is of interest at that instance of execution.

Like embedded script logic, message correlation and partner links can play important roles in a BPEL defined business process. The BPEL simulator 100 of the present invention can accommodate message correlation and partner links despite the fact that the BPEL simulator 100 does not invoke real operations on external Services. Instead, the BPEL simulator 100 can generate appropriate messages for Receive, Reply and Invoke activities through the operation of a message generator 140. The message generator 140 can simulate the communicative interactions with external services via partner links specified in the BPEL document 110. While the BPEL simulator 100 does not invoke actual operations in the external services, the message generator 140 generates appropriate messages for "Receive", "Reply" and "Invoke" operations in order to simulate the conversations between the activities defined in the BPEL document 110 and the external services. Specifically, first, a search is performed in the DOM 130 for information relating to correlation sets and partner links. Then, messages can be generated via the message generator 140.

In operation, subsequent to the initialization of the BPEL simulator 100, the business process described by the BPEL document 110 can be loaded as a DOM 130 where each node in the DOM tree can represent an activity of the business process and where the branches of the DOM tree can represent links and the conditions of execution for the activities at linked nodes. Accordingly, by reference to the DOM 130, the BPEL simulator 100 can traverse the business process by first simulating the execution of the first specified activity at the root node and subsequently by simulating the execution of activities at the linked nodes where permitted by an evaluation of the conditions of execution. The simulation process can continue through the simulation of the execution of the activities as the leaf nodes in the DOM tree.

Notably, an activity node can be implemented programmatically as a thread of execution 160. Each of the links can be treated as objects. As such, when an activity executes, a new thread can be spawned, so that the activity can operate in its own process address space without interfering with other executing activities. In this regard, actual links need not be defined between the threads of execution 160. Rather, the BPEL simulator 100 can track each of the activities by way of the internal state of each activity. Importantly, the definition of a concrete threading model for the BPEL simulator 100 facilitates the achievement of the principal goal of simulating a business process.

The BPEL specification defines each activity which can be included as part of a business process. According to the BPEL specification, the activities of a business process can include attributes such as an "activity id", a "name" to name a few. Consequently, the BPEL simulator 100 can emulate the defined BPEL activities as follows:

Sequence: Each of the child activities are to run sequentially. A parent activity must complete before a child activity can be started.

Flow: A Flow creates Synchronous Links first, linking the parent activity with the child activity with a specific type of link, and then all runs the child activities in parallel.

While: A While activity evaluates a condition and if the condition is true then the child activity will continue to execute until the condition becomes false.

Pick and OnMessage: The Pick activity simulates an incoming message by pausing the business process execution for a short period of time. Subsequently, the Pick activity randomly selects and runs an OnMessage activity. The OnMessage activity has only one child activity which it runs.

Switch and Case: A Switch activity evaluates case conditions until finding a condition which is true. The Switch activity then can call for execution a case activity associated with the true condition. If none of the case conditions are evaluated to a true condition, the Switch activity can locate an "otherwise" condition. If an "otherwise" condition cannot be located, the Switch activity can default to an Empty activity.

Invoke: An Invoke activity spawns another activity, usually a Script or a Staff activity. The Invoke activity does not invoke any Web Services.

Script: A Script activity executes a method from a corresponding Backing Class.

Receive: A Receive activity can generate a message as if the message were actually received. The generated message can vary, based upon the defined attributes of the Receive activity.

Reply: A Reply activity returns a message to the receiver.

Empty: An Empty activity does nothing. The Empty activity is considered to be a "no-op".

Staff: A Staff activity can simulate the retrieval of staff information by pausing the execution of the process for a short period of time.

Assign: An Assign activity can assign or copy an Endpoint Reference in the BPEL document to a Partner Link.

Figure 2:
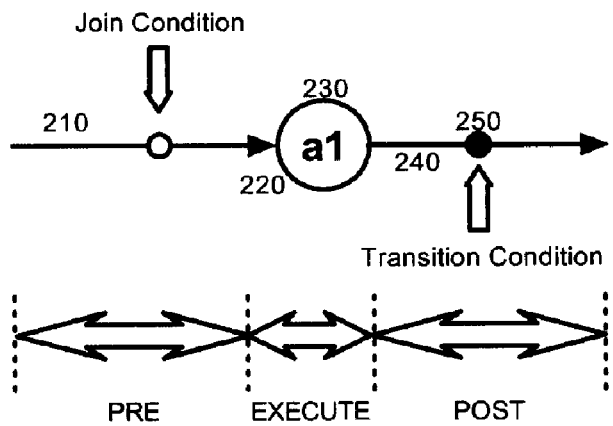
FIG. 2 is a pictorial illustration of an activity modeled for use in the system, method and apparatus for BPEL simulation of FIG. 1; and, FIG. 3 is a flow chart illustrating a process for BPEL simulation in accordance with the present invention.

In accordance with the invention, an activity can be executed in the course of a three stage process illustrated in FIG. 2. In the pre-condition stage, the activity 230 can wait on an incoming link 210 and the join condition 220 can be evaluated. The join condition 220 can determine whether the activity 230 should be started. In the execute stage, the activity can be run presuming that the join condition 220 of the pre-condition stage has been satisfied. Finally, in the post-condition stage, after the activity 230 has completed its execution, one or more child activities can be executed through one or more outgoing links 240 so long as the respective transition conditions 250 of the outgoing links 240 are positively evaluated and the states of the outgoing links 240 are set properly.

In a preferred aspect of the invention, two types of links can be defined inside the BPEL simulator: a generated link and a synchronous link. A generated link can be created when the BPEL simulator maps the DOM tree into a virtual graph to produce links between activities in the virtual graph. On the other hand, a synchronous link can be created between two activities (a source activity and a target activity) inside a Flow activity. There can be many synchronous links as there can be many child activities present inside the Flow activity.

Each synchronous link can have a boolean state. Additionally, the synchronous links can have transition conditions which are evaluated after an activity inside the Flow completes. A transition condition is defined as a method inside the backing class. The BPEL simulator can evaluate a transition condition by invoking the appropriate method. These methods are uniquely identifiable by the combination of a link name, its source activity id and its target activity id. Generated links have a default state of true.

An activity having an incoming link also can have a join condition. Similar to transition conditions, join conditions are defined in the backing class but with a prefix of "join_" plus the activity id. The current activity can only start executing if the join condition has been met. Still, in an activity, the join condition can have a "built-in" condition, for instance the condition can be explicitly defined in the markup as "true", "false", "any" or "all". As an example, the "any" and "all" conditions can be handled by evaluating the status of each of the incoming links: "any" is met if any one of the incoming links evaluates to true; "all" means that all of the incoming links must evaluate to true for the activity to start. The status of each link can be obtained from the transition condition. If no join condition is defined then a default value of true is assumed.

Figure 3:
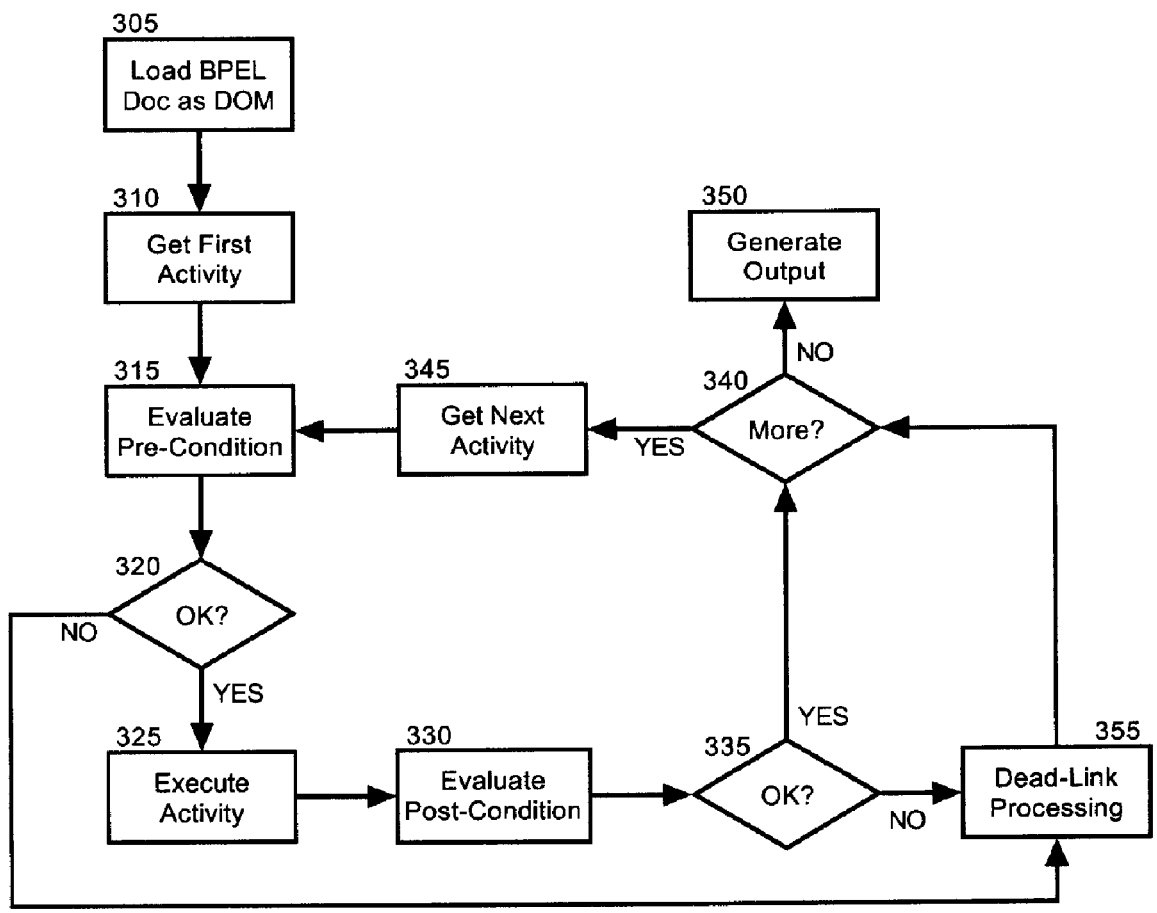

FIG. 3 is a flow chart illustrating a process for BPEL simulation in accordance with the present invention. Beginning first in block 305, a BPEL document can be loaded into a DOM tree. Subsequently, in block 310, a first activity specified by the DOM tree can be retrieved. In block 315, the precondition for the activity can be evaluated. In decision block 320, if the evaluation permits the execution of the activity, in block 325 the execution of the activity can be simulated. Otherwise, in block 355 dead-link processing can be performed for the activity and all following activities.

Specifically, as it is known in the art, the BPEL specification defines Dead Path Elimination. In the BPEL simulator of the present invention, the simulation of Dead Path Elimination can be implemented by skipping the activity, and all child activities of a disabled parent activity. Specifically, when a join condition of an activity fails, the BPEL simulator can flag a signal that the activity should be skipped. Dead Path Elimination can be propagated throughout the child activities. Both the activity states and links states are set to be skipped. Nevertheless, any other parallel activities in the BPEL simulator continue executing as normal. Hence, new states are introduced for activities and links inside the Simulator. An activity in a Dead Path is said to be in a SKIP state. Similarly links, which were only true and false before, can now be in SKIP state. The default representation of the SKIP state is false, such that the SKIP gets evaluated to false for the purpose of evaluating links.

Returning now to FIG. 3, in block 330, once the execution of the activity has been simulated, in block 330 a post-condition can be evaluated for the activity. In decision 335, if the post-condition evaluation does not permit the execution of the next linked activity, once again, dead-link processing can be performed for the next linked activity. In either case, in decision block 340 it can be determined whether additional activities remain to be processed in the DOM tree. If so, the next activity can be retrieved in block 345 and the process can repeat through block 315. Otherwise, in block 350 the output from the simulation can be generated and the process can end.

In conclusion, the BPEL simulator of the present invention resolves the contemporary difficulties associated with test environments for BPEL programs. In this regard, the BPEL simulator is a light-weight, fast-running test environment which requires neither a BPEL engine, a correlation engine nor a support for transactional facilities. Moreover, the BPEL simulator of the present invention can accommodate incremental development strategies by not requiring complete BPEL programs prior to simulation. Additionally, the BPEL simulator remains independent of other programs and Web services which can be simulated internally. Lastly, the BPEL simulator can support the handling of multiple BPEL programs at once.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method for simulating business process execution language (BPEL) programs comprising the steps of:
    producing a document object model (DOM) tree from a BPEL document defining a BPEL program; and,
    simulating said BPEL program by emulating selected BPEL activities for activity nodes defined in said DOM tree.

2. The method of claim 1, further comprising the step of generating an output report for said simulating step.

3. The method of claim 1, wherein said simulating step comprises the steps of:
    (A) selecting a first one of said BPEL activities;
    (B) evaluating a pre-condition to said selected one of said BPEL activities;
    (C) emulating said selected one of said BPEL activities only if permitted by said evaluating step;
    (D) selecting a next one of said BPEL activites; and,
    (E) repeating steps (B) through (D) for each of said BPEL activities.

4. The method of claim 3, wherein said step of selecting a next one of said BPEL activities comprises the steps of:
    evaluating a post-condition for linking to said next one of said BPEL activities; and,
    performing said repeating step only if permitted by said step of evaluating said post-condition.

5. The method of claim 4, further comprising the step of performing dead link elimination if said step of evaluating said post-condition does not permit performing said repeating step.

6. The method of claim 1, wherein said simulating step further comprises the steps of:
producing backing classes for selected ones of said BPEL activities having embedded script logic;
executing said backing classes when simulating said selected ones of said BPEL activities; and,
querying said backing classes to ascertain a state of variables and methods defined by said backing classes subsequent to executing said backing classes.

7. The method of claim 1, further comprising the step of concurrently repeating said producing and simulating steps for multiple BPEL documents.

8. A machine readable storage having stored thereon a computer program for simulating business process execution language (BPEL) programs, the computer program comprising a routine set of instructions which when executed by a machine causes the machine to perform the steps of:
producing a document object model (DOM) tree from a BPEL document defining a BPEL program; and,
simulating said BPEL program by emulating selected BPEL activities for activity nodes defined in said DOM tree.

9. The machine readable storage of claim 8, further comprising an additional set of instructions for causing the machine to further perform the step of generating an output report for said simulating step.

10. The machine readable storage of claim 8, wherein said simulating step comprises the steps of:
(A) selecting a first one said BPEL activities;
(B) evaluating a pre-condition to said selected one of said BPEL activities;
(C) emulating said selected one of said BPEL activities only if permitted by said evaluating step;
(D) selecting a next one of said BPEL activites; and,
(E) repeating steps (B) through (D) for each of said BPEL activities.

11. The machine readable storage of claim 10, wherein said step of selecting a next one of said BPEL activities comprises the steps of:
evaluating a post-condition for linking to said next one of said BPEL activities; and,
performing said repeating step only if permitted by said step of evaluating said post-condition.

12. The machine readable storage of claim 11, further comprising an additional set of instructions for causing the machine to further perform the step of performing dead link elimination if said step of evaluating said post-condition does not permit performing said repeating step.

13. The machine readable storage of claim 8, wherein said simulating step further comprises the steps of:
producing backing classes for selected ones of said BPEL activities having embedded script logic;
executing said backing classes when simulating said selected ones of said BPEL activities; and,
querying said backing classes to ascertain a state of variables and methods defined by said backing classes subsequent to executing said backing classes.

14. The machine readable storage of claim 8, further comprising an additional set of instructions for causing the machine to further perform the step of concurrently repeating said producing and simulating steps for multiple BPEL documents.

15. The machine readable storage of claim 8, wherein each of the selected BPEL activities has a type selected from the group consisting of Sequences, Flow, While, Pick and OnMessage, Switch and Case, Invoke, Script, Receive, Reply, Empty, Staff, and Assign.

* * * * *